United States Patent Office 3,630,879
Patented Dec. 28, 1971

3,630,879
INTERNALLY SHORT-CIRCUITED SOLID OXYGEN-ION ELECTROLYTE CELL
Henry S. Spacil, Schenectady, and Donald W. White, Burnt Hills, N.Y., assignors to General Electric Company
Filed Jan. 2, 1969, Ser. No. 788,581
Int. Cl. B01k *3/00;* C01b *13/04*
U.S. Cl. 204—248                                      4 Claims

ABSTRACT OF THE DISCLOSURE

A tubular leadless solid oxygen-ion electrolyte cell is described employing as the electrolyte an oxygen-ion material having internal short circuiting. Water vapor is admitted to the cathode, where it is dissociated to yield hydrogen, while at the anode a reducing gas flow is supplied at a rate in excess of that required to combine with the oxygen emerging therefrom whereby to render the cell self-driven.

BACKGROUND OF THE INVENTION

The design of high temperature solid-oxygen ion electrolyte fuel cells to produce practical operating structures has been greatly complicated by the difficulty of minimizing or eliminating both thermal losses and Joulean heating losses in the leads.

Operating temperatures must exceed about 600° C. and the usual operating temperature is in excess of 1000° C. in order to produce significant useable power. Under such conditions the temperature difference between the operating zone of the fuel cell to ambient temperature conditions is very great and although insulating materials are available equal to the task of maintaining such differences, such materials are to no avail for controlling the conductive heat losses through avenues, which breach the insulation, as for example, the thermal loss paths existing along the electrical conductors leading from outside the cell to the cell electrodes. Although Joulean heating losses in such electrical conductors tend to offset thermal losses to some extent, still such losses should be held to a controllable minimum in order to maintain acceptable electrical efficiency.

Manifestly, the larger the cross-section of the electrical leads breaching the thermal insulation, the greater the thermal heat loss. The inverse situation exists with the Joulean heating losses in that the larger the cross-sectional area of the electrical leads, the smaller the Joulean heating losses will be, because of the considerably decreased resistance to electron flow. In order to try to minimize both the thermal and the Joulean heating losses the designers of high temperature fuel cells have rejected the use of large single (low voltage, high amperage cells) in favor of series or parallel arrangements of a plurality of small (high voltage, low amperage) cells to produce a given power output. By such an expedient, for a given acceptable Joulean heating loss, the permissible value of the resistance of the electrical leads may be greatly increased and, as a result, the requisite cross-sectional area of the electrical conductors may be decreased substantially. The reduced cross-sectional area thus afforded will reduce, but cannot of course eliminate, thermal losses through the leads since, as a practical matter, there is a limit to the extent of cell subdivision possible.

The results of an actual analysis to determine the relationship of N (the number of cells connected together in series) to the power loss in the electrical power leads are set forth in the table below. This analysis is based upon the normally encountered operating conditions for a solid oxygen-ion water dissociation cell [stabilized zirconia electrolyte with porous nickel electrodes]. These conditions would be, for example, that a reducing gas mixture ($CO/CO_2/H_2/H_2O/N_2$) as may result from the partial combustion of methane is supplied to the anode having a H/C+H ratio of about 0.75 and with the $CO/H_2$ volume thereof being 10% in excess of the water vapor supplied to the cathode. The water vapor is supplied at about 150° C. as an $H_2O/H_2$ mixture (98% $H_2O$) and the exiting product stream of $H_2O/H_2$ is to be at about 900° C. with a 95% reduction in the $H_2O$ content due to dissociation thereof. The reducing gas stream enters at about 250° C. and exits at a temperature of about 900° C. after reaction with oxygen liberated at the anode. The dissociation cell(s) themselves are heated to about 1000° C. and are not short-circuited, electrical power being supplied through a pair of electrical leads in the usual manner, since the open-circuit voltage provided by the small excess volume of reducing gas would be only about −0.007 volt. The reference to "optimum" with respect to the $$\frac{P_{lead}}{P_{lead}+P_{cells}}$$

values means that the voltage being supplied per cells per stack (N) is at a minimum.

TABLE

| N Cells/stack | $\left(\dfrac{P_{lead}}{P_{lead}+P_{cells}}\right)_{optimum} \times 100$ |
|---|---|
| 1 | 52.9 |
| 3 | 23.0 |
| 10 | 10.1 |

As shown by the table, as N increases from one, the amount of power lost in the leads decreases from 52.9% to some lesser figure as shown.

Although at first glance it appears as though the assembly of multiple small cells provides an ideal solution to this problem, it has been found that such cell assemblies, commonly called "fuel cell stacks," are inherently susceptible to structural failure, particularly if it becomes necessary to subject such fuel cell system to thermal cycling and/or considerable pressure differentials. Also as the number of cells so assembled exceeds 1 a substantial increase in the difficulty of construction (and, therefore, the expense) is encountered. As a practical matter it cannot be expected that the power loss in the leads can be reduced below about 10%.

Examples of the assembly of a plurality of fuel cells in series and parallel arrangements are disclosed in U.S. 3,216,911—Kroneberg, U.S. 3,311,504—Johnson and U.S. 3,402,230—White.

At the same time it may be seen from the table that although from the point of view of ease of construction and strength it would be of considerable advantage to be able to employ a single continuous cylindrical electrode/solid electrolyte/electrode composite to supply a given power output, such construction in the present state of the art particularly for operation at temperatures in excess of 800° C., has been impractical because of accompanying excessive thermal losses through the leads.

It would, therefore, advance the art of high temperature solid oxygen-ion electrolyte cell design to be able to employ larger single cell structures (low voltage, high amperage units) at least for specialized uses, while at the same time greatly minimizing or obviating the problems of thermal losses through the leads and Joulean heating losses.

SUMMARY OF THE INVENTION

The above mentioned need has been met by the instant invention at least for one specialized application of high temperature fuel cell structures. The specialized function to which the structure of the instant invention is directed is the dissociation of water vapor primarily for the generation of hydrogen gas by the use of a solid oxygen-ion electrolyte cell. This usage is described in U.S. application S.N. 742,653—Spacil, filed July 5, 1968 (assigned to the assignee of the instant invention and incorporated herein by reference).

A tubular solid oxygen-ion electrolyte cell structure free of electrical conductors, which introduce thermal losses through the leads, is employed for the generation of hydrogen gas by the dissociation of water vapor. This structure preferably consists of a thin continuous cylinder of internally short-circuited solid oxygen-ion material (as the electrolyte) having a first continuous porous electrode structure over its inner surface and, similarly, a second continuous porous electrode structure over its outer surface, neither of which electrodes is externally connected to any electrical conductor. Banks of such cells are enclosed in insulated structures similar to the structure shown in U.S. application Ser. No. 742,824—Spacil, filed July 5, 1968 (assigned to the assignee of the instant invention and incorporated herein by reference), but differing therefrom in that there is no necessity for metallic breach of the insulated structure as is required therein.

BRIEF DESCRIPTION OF THE DRAWING

The exact nature of this invention as well as other objects and advantages thereof will be readily apparent from consideration of the following specification relating to the annexed drawing in which.

DESCRIPTION OF THE PREFERRED EMBODIMENT

Figure 1:
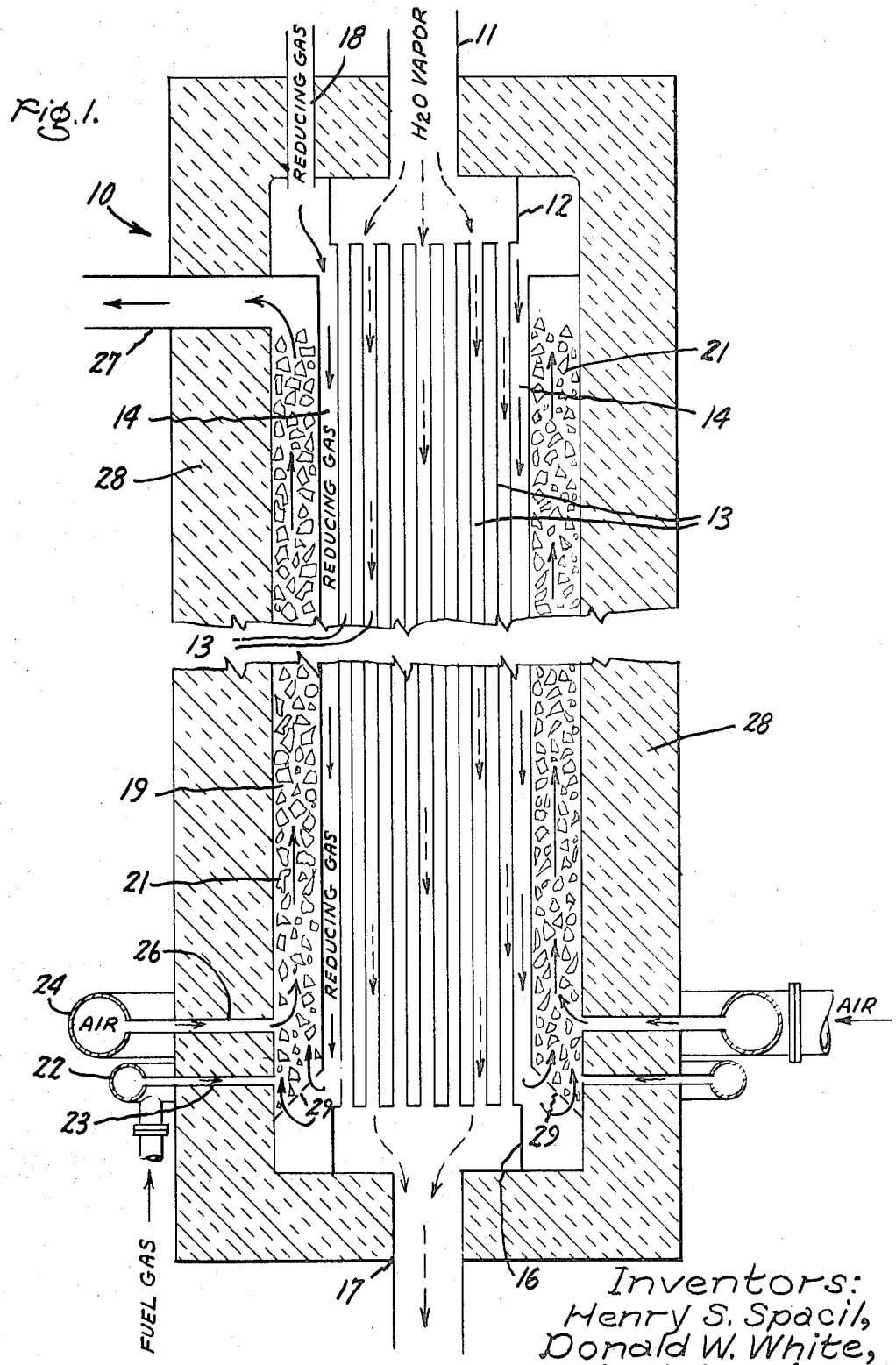
FIG. 1 schematically illustrates in section an assembly of leadless tubular high temperature water vapor dissociation cell structures disposed in an insulating structure showing the flow of gases and vapors into and out of the device.

In essence, the structure schematically represented in the drawing is a chemical reactor in that the chemical energy of a reducing gas alone is relied upon to accomplish the dissociation of steam at the operating temperatures.

Water is converted to steam in a vaporizer (not shown) and the vaporized water is then admitted to hydrogen generator 10 via conduit 11 and inlet manifold 12. From manifold 12 the water vapor enters the plurality of tubular solid oxygen-ion electrolyte water dissociation cells 13, which extend through plenum 14 to outlet manifold 16 and product duct 17. Reducing gas is introduced via conduit 18 to an enlarged portion of plenum 14 to bring this gas flow into contact with the outside surface area of tubes 13. Combustion zone 19, preferably containing refractory particles 21, provides the heat required to maintain the requisite operating temperature to render the solid electrolyte sufficiently oxygen-ion conducting (preferably in excess of 800° C.). The Joulean heating of the cell electrolyte itself, because of the passage of a certain amount of current therethrough, contributes to the requisite heating, but the primary heat source will be the combustion of fuel, as shown herein, or some electrical resistance heating arrangement. One arrangement for the combustion of fuel is shown wherein a fuel gas is supplied via bustle pipe 22 and a plurality of feeder pipes 23 and air is provided via bustle pipe 24 and a plurality of feeder pipes 26. Exhaust combustion gases pass out of the device via duct 27, after which they may be brought into heat exchange relationship with any of the incoming fuel, air, reducing gas and water vapor.

The entire device is covered with a layer of insulation 28 to minimize the loss of heat from the interior thereof.

The internal short-circuiting of electrolyte layer 31 (FIG. 2) is preferably achieved by the periodic segmenting of this annular deposit 31 by means of a series of thin metal rings 32 having sufficient dimension in the radial direction to span from cathode 33 to anode 34 through the electrolyte layer 31.

Such a cylindrical cell wall construction may be prepared, for example, by plasma spraying a first electrode material (porous nickel-zirconia cermet) in a continuous layer of uniform thickness along the length of a mandrel (not shown), applying a mask over the electrode layer to prevent the deposition of the electrolyte layer over spaced annular areas, plasma spraying a layer of stabilized solid electrolyte (stabilized zirconia, for example) segments of uniform thickness thereover, removing the mask, plasma spraying a layer of electrode material over the electrolyte filling in the annular spaces between the segments at the same time and removing the mandrel, as for example by chemical etching.

Figure 3:
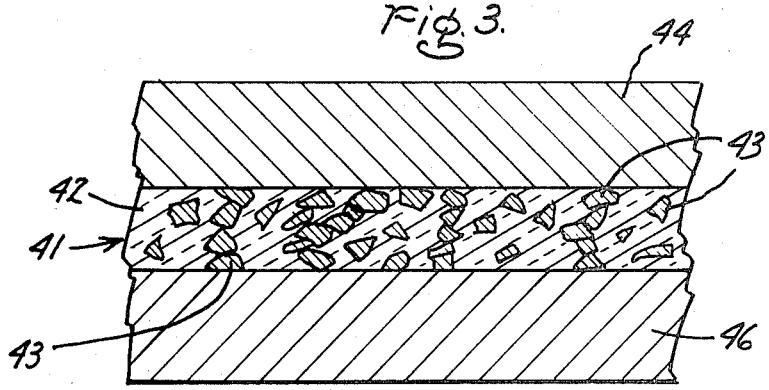
FIG. 3 is a sectional view through a portion of the wall of a cell internally short-circuited in another way.

Modified internal short-circuiting is illustrated in FIG. 3 wherein a thin (as little as 5 mils, for example) electrolyte layer 41 is prepared by mixing a volume ranging from about 30 to less than about 50 volume percent of a metal such as nickel, cobalt, copper or alloys thereof with the solid electrolyte particles so that during plasma spray deposition a relatively uniform dispersion thereof is secured. This method provides both a continuous phase of zirconia 42 for oxygen ion transport through layer 41 and irregularly spaced concentrations of electronic conductor particles 43 extending in contact with each other transversely of electrolyte layer 41 for electron paths between electrodes 44 and 46. Cobalt is much less permeable to the passage of hydrogen than nickel and would, therefore, be preferred. The use of copper limits the maximum temperature of operation to about 1050° C.

In each of the internally short-circuited constructions shown the operative internal circuit consists of electron flow through the short-circuiting paths from anode to cathode, where these electrons are then available for the dissociation reaction:

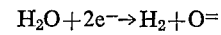

$$H_2O + 2e^- \rightarrow H_2 + O^=$$

whereupon the oxygen ions so formed then move through the solid electrolyte material from the cathode to the anode to enter into a reaction with the reducing gas components in this manner:

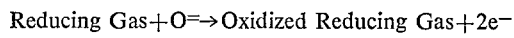

Reducing Gas + $O^=$ → Oxidized Reducing Gas + $2e^-$

These electrons are, therefore, available once more at the anode.

By supplying reducing gas, for example a $CO/H_2$ mixture under pressure, to the anodic electrode the open circuit voltage (encountered in the absence of the reducing gas) of the solid oxygen-ion electrolyte water vapor dissociation cell (0.8 to 1.1 volts) in reduced by an amount in the order of from 0.8 to 1.15 volts depending upon the composition of the reducing gas provided. As a result not only is the anode depolarized, but the open cell voltage of the cell is made negative. Because of the provisions made for internal short-circuiting, the cell then becomes self-driven with only the chemical energy of the reducing gas being required to accomplish the dissociation of steam.

By greatly increasing the excess reducing gas flow and/or by reducing the resistance presented by the electrolyte layer to oxygen-ion flow, the current density available for carrying out the dissociation may be increased to a value at least as high as 1.1 amperes/cm.² at an open-circuit potential of at least −0.3 volt.

Following oxidation at the anode surfaces of cells 13 any unoxidized reducing gas remaining in the outgoing flow may be burned in combustion zone 19 together with the incoming fuel. This may be accomplished for example, by permitting entry of the reducing gas flow to the combustion zone via grate openings 29 (FIG. 1). Also, if preferred, the reducing gas flow may be burned in a separate heater to preheat the input gases.

Figure 2:
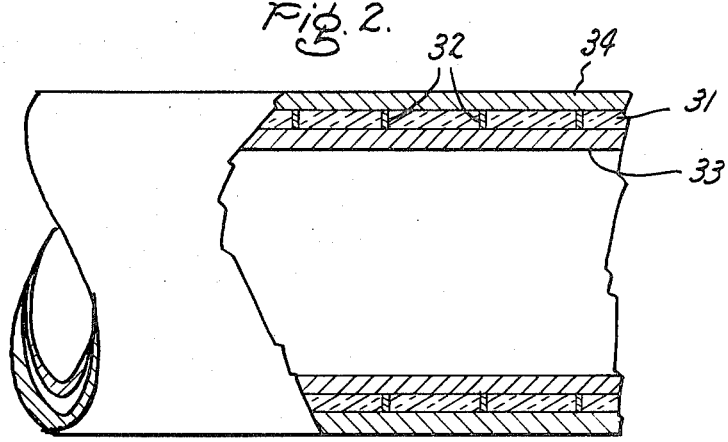
FIG. 2 is a sectional view through a portion of a tubular cell showing one method of achieving internal short-circuiting.

In a cell configuration similar to that shown in FIGS. 2 and 3 electrodes of nickel, cobalt, nickel/zirconia cermet etc. may be employed together with an iron-doped, yttria-stabilized zirconia electrolyte layer.

By way of example, the internally short-circuited cell of FIG. 3 may be made by (a) plasma-spray depositing a first electrode material (porous nickel-zirconia cermet) in a continuous layer along the length of a mandrel (not shown), (b) plasma-spray depositing thereover a continuous layer about 5 mils thick of solid oxygen-ion electrolyte (yttria-stabilized zirconia sintered with iron oxide additive) having uniformly distributed therethrough particles of finely divided nickel in sufficient concentration to form at least about 30 volume percent of the total material deposited; (c) plasma-spray depositing an outer layer of electrode material (porous nickel-zirconia cermet) in a continuous layer to cover the continuous electrolyte layer and (d) removing the mandrel as, for example, by chemical etching.

The composite tubular cell so fashioned is then heat treated to obtain optimum densification of the stabilized zirconia electrolyte layer and to insure that the introduction of the short-circuiting metallic particles does not render the electrolyte layer porous.

The plasma spray deposition techniques are more fully described in U.S. patent application Ser. No. 753,211—Krystyniak, filed Aug. 16, 1968 (assigned to the assignee of the instant invention and incorporated herein by reference).

The benefits of depolarization in accomplishing the dissociation of water vapor accrue even when the reducing species are diluted by the presence of substantial amounts of inert gas diluent, as for example, nitrogen.

When nickel is employed as the internal short-circuiting medium for the electrolyte layer 41, a penalty exists in that some of the hydrogen produced at the cathode diffuses through nickel particles providing the electron short-circuiting paths. This permeating hydrogen exists at the anode and, therefore, is lost from the product stream.

The electrical short-circuiting could, of course, be accomplished externally of the cell in the manner described in the aforementioned Spacil application Ser. No. 742,653, however, the employment of electrical leads would obviate the distinct advantages of internal short-circuiting described herein.

What we claim as new and desire to secure by Letters Patent of the United States is:

1. In a device for decomposing water by electrical action for the generation of hydrogen gas wherein a heated solid oxygen-ion electrolyte cell comprising an anode and a cathode disposed in contact with opposite faces of a layer of substantially non-porous oxygen-ion electrolyte material, first means for introducing a flow of vaporized water in contact with the cathode, second means for introducing a flow of reducing gas in contact with the anode and separate means to conduct gas flows from the cathode and anode, the gas flow from the cathode being hydrogen gas, the improvement comprising means for directly electrically connecting the anode and the cathode, said means consisting of spaced metal shunts extending through the solid oxygen-ion electrolyte layer, said metal shunts constituting the sole means provided for intentional electron flow between said anode and cathode.

2. The improvement substantially as recited in claim 1 wherein the spaced metal shunts consist of solid single-piece metal members.

3. The improvement substantially as recited in claim 1 wherein the spaced metal shunts consist of a series of metal particles in series contact relationship and the electrodes and electrolyte layers are continuous.

4. The improvement substantially as recited in claim 1 wherein the metal of which the metal shunts is composed is selected from the group consisting of nickel, cobalt, copper and alloys thereof.

References Cited

UNITED STATES PATENTS

| | | | |
|---|---|---|---|
| 3,400,054 | 9/1968 | Ruka et al. | 204—1 |
| 3,395,045 | 7/1968 | Ruetschi | 136—86 |

WINSTON A. DOUGLAS, Primary Examiner

H. A. FEELEY, Assistant Examiner

U.S. Cl. X.R.

204—129, 277, 278